United States Patent Office 3,600,370
Patented Aug. 17, 1971

3,600,370
POLYMERIZATION PROCESS AND CATALYST SYSTEM
Lawrence M. Fodor, Bartlesville, Okla., assignor to Phillips Petroleum Company
No Drawing. Filed Oct. 10, 1968, Ser. No. 766,635
Int. Cl. C08f 1/56, 3/10
U.S. Cl. 260—93.7  6 Claims

ABSTRACT OF THE DISCLOSURE

Utilization of a catalyst system formed by admixing (a) a compound of the formula $R_nAlX_{3-n}$; (b) a titanium trichloride-aluminum trichloride complex of the approximate formula $TiCl_3 \cdot 1/3\ AlCl_3$; and (c) a tetrakis (haloalkyl) phosphonium halide of the formula $[(XR')_4P^+]X^-$ in the polymerization of 1-olefins results in the production of polymers having improved properties. In the above formulas, R is selected from alkyl, cycloalkyl and aryl groups, and combinations thereof, having from 1 to 12 carbon atoms, R' is an alkylene group containing 1 to 4 carbon atoms, n is 1, 2 or mixtures thereof, and X is halogen.

BACKGROUND OF THE INVENTION

Polymers of alpha-olefins, particularly of propylene, have long been known and numerous procedures have been disclosed for their production. These polymers are characterized by a greater or lesser degree of stereospecificity; they also vary in degree of crystallinity. Many of the useful properties of these polymers such as ultimate tensile, hardness, range of melting temperature, etc., appear to depend upon the crystallinity of the polymer. Flexural modulus, a property readily measurable by standard procedures, provides a reliable and consistent means for characterizing these polymers. The higher the crystallinity of a polymer the higher the flexural modulus values are found to be. For a commercially attractive product, flexural modulus values must be high, preferably above 190,000 p.s.i. Heretofore, it has been frequently necessary to extract amorphous fractions of the polymer in order to provide products having flexural moduli in this range. It is therefore highly desirable to minimize the production of amorphous polymer as measured for example by the amount of polymer soluble in mixed xylenes. It is further desirable to obtain a polymer having a good balance of properties such as elongation, tensile strength and melt flow.

It is thus an object of this invention to provide an improved process for the production of olefin polymers.

Another object of this invention is to provide a polymerization process in which there is obtained a product having an increase in flexural modulus and a decrease in the xylenes-soluble content.

A further object of this invention is to provide a novel catalyst system which, when employed in the polymerization of 1-olefins, results in an increase in the flexural modulus and a decrease in the xylenes-solubles content of the resulting polymer.

Other aspects, objects and the several advantages of this invention will be apparent to those skilled in the art upon consideration of this disclosure.

According to this invention, I have discovered that polymers of 1-olefins (alpha-olefins) can be obtained having increased flexural modulus values and a decreased xylenes-solubles content when the polymerization is conducted in the presence of a catalyst system formed by admixing (a) an organoaluminum compound or mixture of such compounds of the formula $R_nAlX_{3-n}$ wherein R is alkyl, cycloalkyl, aryl or combinations thereof having 1 to 12 carbon atoms, X is a halogen and n is 1, 2 or mixtures thereof; (b) a titanium trichloride-aluminum trichloride complex such as that resulting from the reaction of titanium tetrachloride and aluminum and having the approximate formula $TiCl_3 \cdot 1/3\ AlCl_3$; and (c) a tetrakis (haloalkyl) phosphonium halide of the formula $$[(XR')_4P^+]X^-$$

wherein R' is an alkylene group containing 1 to 4 carbon atoms and X is halogen.

The enumeration of alkyl, cycloalkyl and aryl radicals herein in defining the formulas is intended to include the various mixed radicals such as alkaryl, aralkyl, alkylcycloalkyl, cycloalkylaryl, and the like.

The compounds and mixtures of compounds represented by the formula $R_nAlX_{3-n}$ and utilized as component (a) of the catalyst system of the invention are well known in the art. Examples of such compounds are diethylaluminum chloride, ethylaluminum dichloride, ethylaluminum sesquichloride and the like.

The titanium chloride-aluminum chloride complex utilized as component (b) of the catalyst system according to this invention is also well known in the art. It can be formed, for example, by reacting titanium tetrachloride with metallic aluminum. The complex can be represented by the formula $TiCl_3 \cdot 1/3\ AlCl_3$.

Examples of the tetrakis (haloalkyl) phosphonium halide compounds of the formula $[(XR')_4P^+]X^-$ which are component (c) of the catalyst are tetrakis (chloromethyl) phosphonium chloride, tetrakis(bromomethyl) phosphonium iodide, tetrakis(1-chloroethyl) phosphonium bromide, tetrakis(2-bromoethyl) phosphonium iodide, tetrakis(1-methyl-2-chloroethyl phosphonium bromide, tetrakis(4-iodobutyl) phosphonium chloride, tetrakis(2-methyl-3-fluoropropyl) phosphonium chloride, tetrakis(1-ethyl-2-iodoethyl) phosphonium fluoride, and the like.

Broad and preferred ranges for the molar ratio of the catalyst components are:

| Ratio to $TiCl_3 \cdot \frac{1}{3}AlCl_3$ | Broad | Preferred |
| --- | --- | --- |
| $R-AlX_{3-n}$ | 0.5:1–10:1 | 1:1 7.5:1 |
| Tetrakis(haloalkyl) phosphonium halide | 0.01:1–3:1 | 0.05:1–2:1 |

The total catalyst concentration is usually in the range of 0.005 to 10 weight percent of the olefin being polymerized, but concentrations outside this range are operative.

The polymerization reaction is carried out either in a mass system—i.e., the olefin being polymerized acts as the reaction medium—or in an inert hydrocarbon diluent, such as a paraffin, cycloparaffin, or aromatic hydrocarbon or mixtures thereof having up to 20 carbon atoms per molecule. Examples of hydrocarbons that can be used are pentane, hexane, isooctane, eicosane, cyclohexane, methylcyclopentane, benzene, toluene, naphthalene, anthracene and the like. When an inert diluent is used, the volume ratio of diluent to olefin is in the range of 1:1 to 10:1, preferably 3:1 to 7:1.

The polymerization is conducted at temperatures in the range of 80 to 250° F., preferably 100 to 200° F. The pressure can be sufficient to maintain the reaction mixture substantially in the liquid phase, or—particularly in a mass system—can be such that the olefin is in the vapor phase. The reaction time is in the range of 10 minutes to 75 hours, more frequently 30 minutes to 25 hours.

Although the invention is illustrated by the polymerization of propylene, any aliphatic 1-olefin having up to 8 carbon atoms per molecule can be used. Preferably those having 3 to 7 carbon atoms are used, such as propylene, 1 - butene, 1-hexene, 4-methyl-1-pentene, 1- heptene, and the like. Copolymers of two or more of these olefins can be prepared using the catalyst composition of this invention.

It is within the scope of the invention to use hydrogen in a concentration of about 0.08 to 1 mol percent of the propylene for controlling the molecular weight of the polymer.

The following example will further illustrate the invention, although it is not intended that the invention be limited thereto.

EXAMPLE

Data illustrating the process of the invention were obtained by polymerizing propylene in a 1-liter, stirred reactor in 2.5-hour runs at 130° F. and about 300 p.s.i.g. with 250 grams of propylene and 0.021 mol of hydrogen (equivalent to 0.35 mol percent hydrogen based on the propylene) present in the reaction system. As catalyst, there was employed a mixture of diethylaluminum chloride, $TiCl_3 \cdot 1/3\ AlCl_3$ and tetrakis(chloromethyl) phosphonium chloride.

The following results were obtained:

| Run No. | Catalyst mol ratio | | | Wt. percent catalyst based on olefin | Percent xylene solubles [a] | Melt flow [b] | Flexural modulus, p.s.i.×10⁻³ [c] | Elongation, percent [d] | Tensile, p.s.i. [d] |
|---|---|---|---|---|---|---|---|---|---|
| | Al | P | Ti | | | | | | |
| 1 | 2.91 | 0 | 1 | 0.126 | 5.2 | 8.76 | 204 | 7 | [e] 4,150 |
| 2 | 3.37 | 0.59 | 1 | 0.150 | 5.4 | 3.14 | 206 | >100 | 4,760 |
| 3 | 2.59 | 0.90 | 1 | 0.191 | 4.8 | 4.73 | 225 | 68 | 4,990 |
| 4 | 2.34 | 1.63 | 1 | 0.256 | 4.6 | 6.28 | 206 | 20 | 4,670 |

[a] Determined by placing 0.95 g. of polymer in a centrifuge tube, adding 95 ml. mixed xylenes, heating for 15 minutes at 285° F., cooling, centrifuging, evaporating the solvent from a 25-ml. aliquot of the supernatant liquid, weighing the residue, and multiplying by 400.
[b] ASTM D 1238-62T, condition L.
[c] ASTM D 790-63.
[d] ASTM D 638-61T; crosshead speed 2"/min.
[e] Break.

The above data show that utilization of the catalyst system of the invention results in an increase in flexural modulus of the polymer obtained therewith when compared with polymer made in the absence of the phosphorus compound. In addition, the data also demonstrate that improvements were obtained in elongation, tensile strength and, in most instances, in xylene soluble content of the polymer.

Reasonable variations and modifications of this invention can be made, or followed, in view of the foregoing disclosure, without departing from the spirit or scope thereof.

I claim:
1. A catalyst system formed on admixing (a) a compound of the formula $R_nAlX_{3-n}$ wherein R is alkyl, cycloalkyl, aryl or combinations thereof having 1 to 12 carbon atoms, X is a halogen, and $n$ is 1, 1.5, or 2; (b) a titanium trichloride-aluminum trichloride complex of the formula $TiCl_3 \cdot 1/3AlCl_3$; and (c) a tetrakis (haloalkyl) phosphonium halide of the formula $[(XR')_4P^+]X^-$ wherein R' is an alkylene group containing 1 to 4 carbon atoms and X is halogen and wherein the molar ratio of (a) to (b) is in the range of 0.5:1 to 10:1 and the molar ratio of (c) to (b) is in the range of 0.01:1 to 3:1.

2. A catalyst system according to claim 1 formed by admixing (a) diethylaluminum chloride; (b) a titanium trichloride-aluminum trichloride complex of the formula $TiCl_3 \cdot 1/3AlCl_3$ and (c) tetrakis (chloromethyl) phosphonium chloride.

3. A process which comprises polymerizing an aliphatic 1-olefin having from 3 to 8 carbon atoms per molecule in the presence of a catalyst which forms on mixing (a) a compound of the formula $R_nAlX_{3-n}$ wherein R is alkyl, cycloalkyl, aryl or combinations thereof having 1 to 12 carbon atoms, X is a halogen, and $n$ is 1, 1.5, or 2; (b) a titanium trichloride-aluminum trichloride complex of the formula $TiCl_3 \cdot 1/3AlCl_3$; and (c) a tetrakis (haloalkyl) phosphonium halide of the formula $[(XR')_4P^+]X^-$ wherein R' is an alkylene group containing 1 to 4 carbon atoms and X is halogen and wherein the molar ratio of (a) to (b) is in the range of 0.5:1 to 10:1 and the molar ratio of (c) to (b) is in the range of 0.01:1 to 3:1.

4. A process according to claim 3 wherein said catalyst is formed by admixing (a) diethylaluminum chloride; (b) a titanium trichloride-aluminum trichloride complex of the formula $TiCl_3 \cdot 1/3AlCl_3$ and (c) tetrakis (chloromethyl) phosphonium chloride.

5. A process according to claim 4 wherein the polymerization is carried out at a temperature in the range of 80 to 250° F. and a pressure sufficient to maintain the reaction mixture in the liquid phase.

6. A process according to claim 5 wherein said 1-olefin is propylene, the admixed catalyst is present in an amount in the range of 0.005 to 10 weight percent and hydrogen is present in a concentration of about 0.08 to 1 mol percent of said olefin.

References Cited
UNITED STATES PATENTS 3,277,069  10/1966  Nolta et al. _____ 260—93.7

JOSEPH L. SCHOFER, Primary Examiner

E. J. SMITH, Assistant Examiner

U.S. Cl. X.R.

252—429; 260—88.2